July 1, 1924.
O. W. WILLCOX
1,499,492
PREPARATION OF ARTIFICIAL BASE EXCHANGING BODIES
Filed Feb. 19, 1920
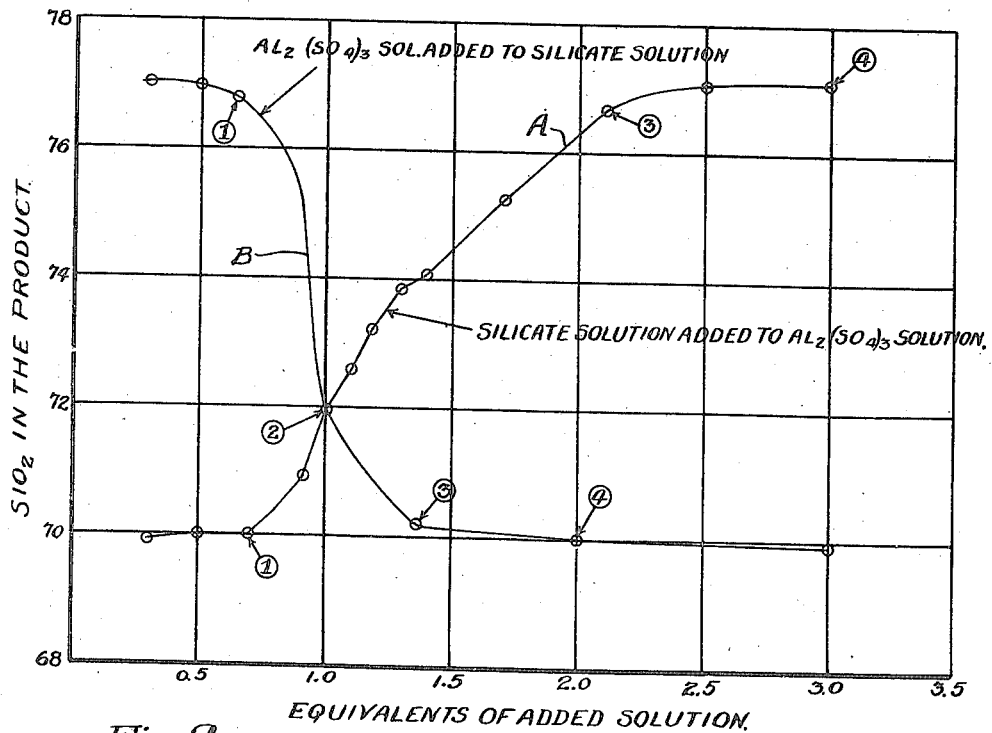
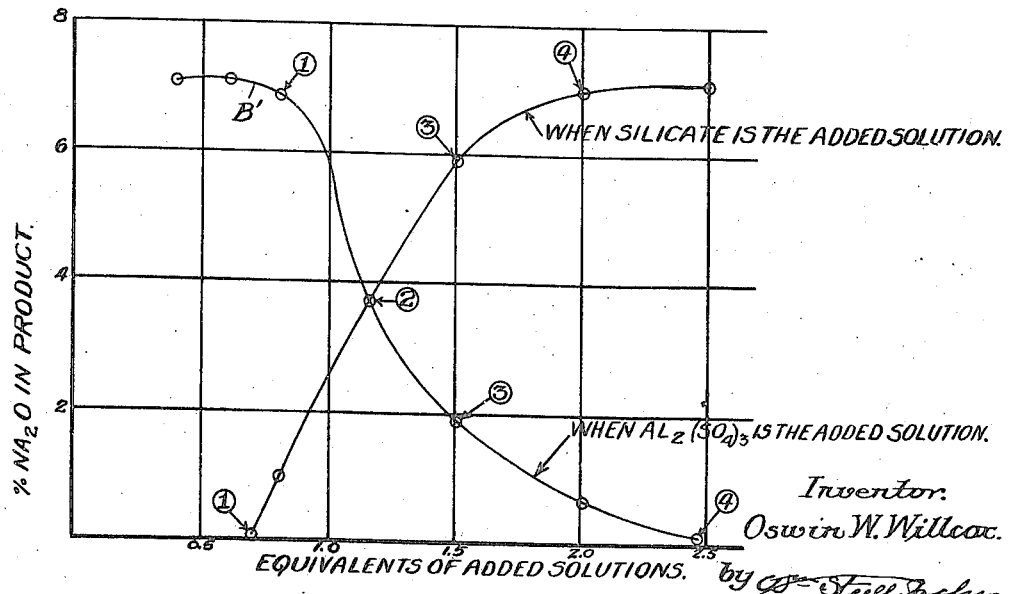
Inventor:
Oswin W. Willcox.
by ... Attorney.

UNITED STATES PATENT OFFICE.

OSWIN W. WILLCOX, OF RIDGEWOOD, NEW JERSEY, ASSIGNOR TO AMERICAN ZEOLITE CORPORATION, OF PATERSON, NEW JERSEY, A CORPORATION OF NEW YORK.

PREPARATION OF ARTIFICIAL BASE-EXCHANGING BODIES.

Application filed February 19, 1920. Serial No. 359,843.

*To all whom it may concern:*

Be it known that I, OSWIN W. WILLCOX, a citizen of the United States, residing at 61 Union St., Ridgewood, in the county of Bergen and State of New Jersey, have invented a certain new and useful Preparation of Artificial Base-Exchanging Bodies, of which the following is a specification.

My invention relates to the manufacture of base-exchanging substances, serving the same general purpose as zeolites, but having greater range of service and greater capacity than zeolites and not coming within the definition of that term.

The purposes of my invention are, primarily, to increase the capacity (the base-exchanging content) of the product when used for water softening and kindred liquid-treating purposes; to control coagulation so as to make alkali metallo silicates and metallo silicic acids having a harder grain and greater gravimetric density than in the absence of such control; to make a new hydrated silica which I have called herein cyclo silicic acid, having liquid-treating properties of unusual character, and also other uses; to make a new alkali silicate, known as a cyclo silicate, and to produce all of these products by new methods or processes, producing insoluble products preferably in the form of hard grains.

Further purposes are to provide new and in some cases alternative methods of regeneration of base-exchanging liquid-treating substances, whether by an acid or a salt.

A further purpose is to extend the range of chemical compounds capable of dissociation by base-exchanging substances on the contact principle.

A further purpose is to utilize the processes disclosed interchangeably to produce different products and change one of the products into another by a process similar to regeneration of by supplemental treatment.

A further purpose is to utilize an anti-coagulant salt to render some substances available for manufacture of my products, thereby preventing undesirable hydrolysis of the substances, permissibly using the same material as an anti-coagulant for this purpose and for a coagulant or coagulant control to determine the ultimate physical character of the product formed.

A further purpose is to harden the product additionally by using two salts of a metal together, obtaining quite noticeably harder product where $Fe_2(SO_4)_3$, for example, is used, even a trace, in a mixture with $Al_2(SO_4)_3$.

A further purpose is to harden by syneresis whether by ageing the colloidal precipitate or by washing it beyond the point necessary to remove the associated soluble salts or by both of these.

A further purpose is to increase the quantity of base-exchanging content, as by treatment with a carbonate after formation of the product and permissibly during quenching.

I shall endeavor throughout my specification to describe and deal with types of chemical reagents suitable for performing the functions and securing the results, in the belief that the information thereby given will enable those skilled in the art to understand the subject more thoroughly than would otherwise be the case, giving specific examples by way of illustration and stating freely what I believe to be the facts; but without the intention to limit myself to the species described and recognizing that in this rather abstruse subject errors in or differences of opinion as to the theory may occur. I recognize also that the value of the invention itself, in view of the disclosure of one or more practical ways of carrying it out, will be little affected by any errors in theory which may occur; also that in practicing my invention, those skilled in the art will probably find other reagents and coagulants, or controls or anti-coagulants than have been indicated or suggested by me, but which, found as a result of my disclosures herein and depending upon the same general principles for operation, will come fairly within the spirit and scope of my claims.

I have illustrated a portion of my invention in connection with curves in Figures 1 and 2 showing the effects upon the product of different proportions of the reagents in two different orders of application.

In the manufacture of base-exchanging substances by the precipitation process to secure fluid-treating solids, a colloidal precipitate is formed which is subsequently dried to prevent "reversion" into a soluble disperse form and to make a granular product which is then insoluble in water.

In order to explain my invention clearly, I shall first discuss the general reactions taking place and the general conditions and physical properties when a dilute soluble salt of aluminium or a heavy metal, which may be either normal, acid or basic, is mixed with a dilute soluble salt of silicic acid. Because aqueous solutions are the cheapest and commonest forms of solution, because there is a large and readily available variety of heavy metal salts soluble in water which salts are well suited for my purpose and because the alkali metal silicates which I find most suitable are soluble in water, I describe herein processes using water-soluble materials and aqueous solutions, but without intending to limit myself to aqueous solutions.

In the commercial application of my invention, though in practice my invention will find its use chiefly, if not entirely, in the combinations of salts of aluminium or (and) the common heavy metals because they are readily available, inexpensive and easily handled, it will be evident that the theoretic aspects of my invention are much broader, and it is believed that a great many heavy metal salts will be found capable of use to form products having the character of my products and coming within my broad claims, which would not now be listed as salts of common heavy metals. I have therefore selected the language "salts of aluminium and common heavy metals" and "aluminium and common heavy metal salts" and other language, employing the word "common," with a view to covering the more common and well-known heavy metal salts, as they are now known or later appear, including such salts as those of zinc, copper, tin, manganese, lead, titanium, molybdenum, silver and also metals of the iron and aluminium groups as understood in qualitative chemistry, including particularly iron, aluminium, chromium, cobalt and nickel. Owing to the looseness of definition of "heavy metals" and "salts" by which they include aluminium in some discussions thereof and omit aluminium in others, I will refer to the metals intended to be utilized by me as heavy metals and aluminium, intending thereby to cover those which lie in qualitative analyses within the groups known as the iron, aluminium and copper groups, plus silver, titanium and molybdenum.

Of these metals the most common, cheapest and best known for ordinary purposes are aluminium, iron, tin, manganese, lead and zinc, which because of their comparatively low cost would, at the present time be considered first. The selection among the available metal salts must, of course, be made with reference to any specific purpose or special use which is intended to be served.

When a soluble salt of a suitable metal, here typified by aluminium sulfate, and a soluble combination from which the silicic acid radical is available, here typified by sodium silicate, are combined, they may be made to produce an entirely new compound, insoluble and of colloidal nature, containing a portion or all of the basic radical of the metallic salt, a portion of the basic radical of the silicic acid salt and a portion or the whole of the acid radical of the silicic acid salt. The composition of this resulting precipitate may be varied at will so as to contain almost any proportion of the basic radical of the soluble silicic acid salt, varying from none to a condition of saturation therewith. These different precipitates can be intentionally and reliably produced by varying the proportions and conditions under which the product is secured. Of the various sodium silicates I select for illustration that commonly known as water glass. The character of my products, as well as their natures and properties will vary somewhat according to the metallic salt used and, in particular, according to the manner of mixing the two solutions, and the relative proportions of the two prime reagents. Thus, the order in which the reagents are introduced seriously affects the character of the product as initially made; also the presence of a coagulant such as sodium sulfate or sodium chloride, the use of two or more metallic salts, or the promotion of synæresis, cause a difference in the physical properties of the product.

As alkalinity or acidity to phenolphthalein indicator forms a convenient division point between different parts of the process or different characteristics of product, it will be convenient to discuss this first.

*Adding alkali silicate.*

Taking up first in detail, for example, the addition of sodium silicate (water glass) solution to aluminium sulfate solution, at the start the percentage of alumina in the precipitate will be relatively high, that of the silicic acid radical low and the sodium oxide absent or relatively low, as shown by curves A and A' in Figures 1 and 2, in which the $SiO_2$ and $Na_2O$ in the products are plotted along one axis and the equivalents of added solution along the other.

Because the aluminium sulfate is present in great excess at the start, all of the sodium silicate solution is at first used up as fast as added. That is, it is completely decomposed and its silicic acid radical all enters into combination with the basic radical alumina from the aluminium sulfate to form an insoluble complex acid. The insoluble product formed in this stage therefore, contains a higher percentage of alumina relatively to silica than at any other stage of this reaction. As yet, the product contains no sodium oxide and is a pure or nearly pure metallo (alumino) silicic acid. This metallo silicic acid is one of the new products which I aim to manufacture and is itself advantageous for water treating and other purposes.

Assuming that the sodium silicate employed is of the usual variety, having sodium oxide and silicon dioxide in the ratio of 1 to 3 (represented in symbols by $3SiO_2.Na_2O$), then this initial alumino silicic acid will have approximately the formula $$15SiO_2.2Al_2O_3.9H_2O.$$

This formula and the others given herein are calculated from actual chemical analyses of the several products which products may or may not be definite chemical compounds.

The composition of the product formed remains the same on continued addition of sodium silicate until the amount added has reached about three-fourths of that which would be required to destroy the acid reaction of the total quantity of aluminium sulfate originally present. This may be considered the end of the first phase of the possible reactions.

If the addition of sodium silicate is continued beyond this point, which is indicated on curve A, A' in Figures 1 and 2, by the points marked 1, the alumino silicic acid already formed begins to combine with the sodium silicate to form a different kind of a product; either a new alumino silicic acid containing more silica and also sodium oxide, or a salt of an alumino silicic acid, whichever way we look at it, which product from this point on forms additional products or a new product, if made by these reagents, containing sodium oxide. It also begins to contain a greater proportion of silica with respect to the alumina. Insomuch as it continues to have acid properties, I prefer to consider this as an acid.

It will be noted that two reactions are now taking place, since some of the sodium silicate forms a new product with the alumino silicic acid, and another part of the sodium silicate continues to act upon the aluminium sulfate still remaining undecomposed in the solution to make new alumino silicic acid.

The action of the sodium silicate upon the aluminium sulfate continues until the aluminium sulfate completely disappears as such from the reaction mixture. This may be considered as the end of the second phase. At this point the solution becomes neutral to phenolphthalein and corresponds approximately to the formula $$24SiO_2.3Al_2O_3.Na_2O.12H_2O.$$

This point is indicated on the curves A, A' in Figures 1 and 2 at 2 and corresponds in its condition of neutrality to the point which Rudorf selected as the essential objective, characteristic of his process described in U. S. Patent 1,263,707, issued April 23rd, 1918. However, Rudorf did not there recognize the presence of sodium oxide.

It has been tacitly assumed previous to my invention that after the reaction mixture had been made alkaline by an excess of sodium silicate, sufficient to produce a pink color with phenolphthalein, any excess of sodium silicate thereafter added would be found in undiminished amount in the solution. I have discovered that this is not the case. I have found that this does not mark the end of the process of combining silica with alumina in this reaction, as had been previously assumed, but that it merely marks the passage through neutrality to alkalinity and the disappearance of aluminium sulfate as such, from the reaction mixture. The other reaction, by which the sodium silicate is directly combined with the metallo silicic acids already formed, begun when about three-fourths of the aluminium sulfate had been neutralized, continues, still further enriching the precipitate in silica and sodium oxide.

At neutrality a new phase begins in which the reaction is solely between sodium silicate and the alumino silicic acid product previously formed.

As additions of sodium silicate continue, the product already formed becomes saturated, or nearly saturated, with the constituents of sodium silicate, so that the affinity of the product for additional sodium silicate is correspondingly diminished, with the result that at length the sodium silicate which is taken up is absorbed principally, if not entirely, by reason of mass action. This marks the end of the third stage and corresponds approximately to point 3 on these curves A and A'.

Ultimately the alumino silicic acid becomes fully saturated. This point of saturation with respect to sodium silicate is intended to be indicated at some such point as 4 on the two curves A and A' of Figures 1 and 2 and marks the end of the fourth phase.

Curve A, Figure 1, shows that the rate of increase of $SiO_2$ in the product is greatest in the interval between point 1, the end of the first phase, and point 2, where the aluminium sulfate disappears as such. The rate still continues to be rapid, however, up to approximately point 3 where the alumino silicic acid product ceases to combine with all of the constituents of the sodium silicate. Beyond this point, 3, excess sodium silicate begins to be found in the solution; and the proportion of added sodium silicate which remains uncombined gains in increasing proportions until point 4 is reached, where the curve flattens out and beyond which any excess of sodium silicate added is found undiminished in the mother liquor.

As will be seen, the composition differs from point to point according to the amount of sodium silicate which has been added to the aluminium sulfate solution. About point 1, the product corresponds to the approximate formula $$15SiO_2.2Al_2O_3.9H_2O.$$

At point 2 it corresponds to $$24SiO_2.3Al_2O_3.Na_2O.12H_2O.$$

About point 3 the approximate formula is $$12SiO_2.Al_2O_3.Na_2O.6H_2O.$$

From point 4, beyond which no excess of sodium silicate produces any effect, the composition will approximate the proportions $$19SiO_2.Al_2O_3.2Na_2O.7H_2O.$$

Considering curve A in Figure 1, in general, the addition of sodium silicate as it proceeds beyond the point 1, causes the products to become richer proportionately both in silica and in sodium oxide and poorer in alumina and combined water. The decrease in the percentage of alumina, however, is merely relative, as no alumina actually passes out of the combination.

The discussion of the addition of sodium silicate to the aluminium sulfate given above applies generally, whether these two reagents are the only substances in the solution; or whether aluminium sulfate and a second,—permissibly a hydrolyzable salt of a heavy metal, normal or basic, such as ferric sulfate, for example, are mixed for use in the reaction in which the aluminium sulfate acts as an anti-coagulant to prevent hydrolysis of the ferric sulfate; or whether an anti-coagulant of a different type— merely an indifferent salt—is used to prevent hydrolysis of a reagent which would hydrolyze otherwise; or if, as hereinafter discussed, a coagulant substance is included in the solution for the purpose of affecting the chemical formula and physical characteristics of the ultimate product.

The resultant curve also is substantially the same as that in curve A of Figure 1 whether a coagulant or an anti-coagulant be used or not, and is not much changed by variation in choice of the metal or of different salts of the same metal and (or) by reason of the use of a different alkali metal silicate.

Adding the metal salt.

The order of the addition of the reagents may be reversed, to add the solution of the metal salt to the solution of the alkali metal silicate, and the same results can be attained, though in a different order.

Using the same illustration, of aluminium sulfate as the metal salt added and sodium silicate as the alkali metal silicate, I have plotted two curves B and B' in Figures 1 and 2, using the same ordinates and abscissæ as for curves A and A'.

When the addition of the aluminium sulfate is first begun the sodium silicate has an intense alkaline reaction to phenolphthalein and the reaction between the sodium silicate and the first portions of aluminium sulfate takes place in the presence of a great excess of sodium silicate.

During this period the product formed has a maximum of silica and of sodium oxide content and agrees almost precisely with the product obtained in the other process at and beyond point 4 in curves A and A'.

This product, having a maximum sodium oxide content continues to be formed until the amount of aluminium sulfate added reaches about three-fourths of the amount which would be required to completely neutralize the entire quantity of sodium silicate used. From the standpoint of the operation (but not of product) this point is analogous to point 1 of curves A and A', in that at this point the added reagent begins to attack the product already formed in addition to attacking the other reagent. From the standpoint of the product formed it corresponds nearly to point 3 of curves A and A'. Both reactions continue side by side on further addition of aluminium sulfate until the sodium silicate as such has entirely disappeared from the solution, which then becomes neutral to phenolphthalein indicator.

Beyond this point of neutrality the addition of aluminium sulfate to the solution makes the solution acid to phenolphthalein.

Just so in the analogous stage of the method of mixing first described, addition of the silicate makes it alkaline. From the point of neutrality the new product is the only product formed and is due to the continued reactions between the aluminium sulfate and the product already formed, just as in the previous method the new product—a different product—was due to the continued combination of the sodium silicate with the products already formed.

Point 2 on curves B and B', where neutrality to the phenolphthalein occurs thus corresponds with point 2 on curves A and A', and also to the point at which Rudorf stopped.

Eventually, at point 3, the power of the products already formed to react with additional aluminium sulfate becomes less and less, and dependent upon mass action; the quantity of aluminium sulfate found in the reaction liquid continually increases; until finally a point (4) is reached beyond which any added excess of aluminium sulfate is found in the mother liquor in undiminished amount.

Generally considered, up to point 1 where the aluminium sulfate first begins to attack the product already formed, the product has a maximum of sodium oxide and silica content. Beyond this point sodium oxide begins to be removed from the product as sodium sulfate.

The percentage of silica begins to decrease also, a relative matter merely, as no silica is actually removed. The removal of sodium oxide (as sodium sulfate) from the product and the latter's progressive enrichment in alumina and combined water continue with further addition of aluminium sulfate till the products formed no longer contain any sodium oxide.

About point 1 in the curves B and B', the product has a composition represented approximately by the empirical formula

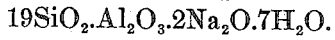

corresponding generally to point 4 in the curves A and A' and constituting preeminently a product for direct use as a base-exchanging substance in water softening on the contact principle. About point 4 of curves B and B', the composition corresponds approximately with the empirical formula

corresponding also generally to the product at point 1 in curves A and A', and forming preeminently an alumino silicic acid of maximum acidity, since it contains no sodium oxide.

The product which is sensibly free from sodium oxide has maximum acidity as measured by its power of decomposing sodium carbonate and other alkaline substances; also, though acidity reduces with addition of sodium, a product with considerable sodium may still be acid.

The intermediate products partake of the nature of both of these substances according to their respective positions on the curve. They are capable of being used either for the direct softening of water or as alumino silicic acids. As will more clearly be pointed out later, the alumino (or other metallo) silicic acid can be changed into an alkali metallo silicate (point 1 to B' to point 4 thereof), by treating with a carbonate or hydrate of an alkali; the product at point 4, curve B', high in sodium oxide, can be changed by an acid to metallo silicic acid— and even to cyclo silicic acid and the latter can be changed by an alkali metal hydrate or carbonate to an alkali metal cyclo silicate. My products are therefore capable of interchange by treatment in the bed (resembling regeneration) or separate therefrom but subsequent to their manufacture.

It will be noted that I start with a salt of a metal in which the metal forms a base; but that in both the alkali metallo silicate and the metallo silicic acid form the metal has shifted its character and occupies and forms a part of the acid radical instead of a basic radical, in the first case having a basic radical attached to it and in the second case being capable of taking up the basic radical. This amphoteric character is highly important in this part of my invention.

For practical and industrial purposes and where a direct water softening product is desired, it is better to obtain the product represented by the upper parts of the curves and a maximum of sodium oxide in the product can be obtained by proceeding to point 4 in A or stopping at about point 1 in B'.

Where alumino silicic acid is desired, the aim will be to obtain the product represented by the lower parts of the curves and a maximum of acidity can be obtained by stopping at about point 1 of A or proceeding to point 4 of B'.

As will be evident, both products can be made by either process. However, from the standpoint of convenience and economy, it is desirable to make the alumino silicic acid by adding the sulfate to the silicate, continuing to about point 3 of curve B, Figure 1, and to make the base-exchanging body by adding sodium silicate to the aluminium sulfate. The reason for preferably stopping at point 3 of curves A' and B' of these operations is based upon economy of operation.

Where either process is stopped short of neutrality there will be a corresponding excess of one of the reagents in the mother liquor and this mother liquor can therefore be used in part in connection with a new reagent for a succeeding operation, either of the same character, or of the reversal. This is true also where either process is extended beyond the condition of neutrality whether to a condition of alkalinity or acidity.

From the above discussion it will have become evident that the indicator tests are of no special practical value in carrying out the manufacture of either metallo silicic acid or the alkali metallo silicate having a maximum base-exchanging content. In the process by which the aluminium sulfate is added to the sodium silicate, the indicator cannot be used to show the point of maximum or even very high base-exchanging body because neutrality does not occur until after this has been passed; and it cannot be used to show the desirable point for obtaining alumino silicic acid because the neutrality occurs long before this point has been reached.

Applying to the process wherein the sodium silicate is added to the aluminium sulfate, this neutrality cannot be used as a means of determining the point of highest acidity of metallo silicic acid content, i. e., less than about 75% neutralization, because it does not occur until after this point has been well passed; and it cannot be used to determine the point of highest sodium oxide content because it occurs long before this, point of maximum $Na_2O$ content has been reached.

*Tests for use in practical operations.*

When the operation is being carried out with aluminium sulfate corresponding to the formula $Al_2(SO_4)_3.18H_2O$. and the sodium silicate having proportions of silica and sodium oxide represented by $3SiO_2.Na_2O$. point 1 of either curve can be located readily by the rule that this point corresponds to the addition of approximately 75% of the amount of the one reagent that would be required to neutralize the entire amount of the other reagent to phenolphthalein. Point 3 of either curve is reached approximately by a 40% excess of the added reagent, upon the basis of 100%, the amount required to effect complete neutralization.

As a specific example of my process I will take the process of making the product corresponding to point 3 when sodium silicate is added to aluminium sulfate. From analysis and test I have found that a solution containing 5 lbs. of $Al_2(SO_4)_3.18H_2O$. would be exactly neutralized by a solution containing 23 lbs. of a particular lot of ordinary sodium silicate solution of 40° Bé. strength, and vice versa. To reach point 3 will require about 40% in excess of the amount required for neutralization. I therefore weigh out 32.2 lbs. of the sodium silicate solution and dilute it with water to a volume of about 10 gallons. I then dissolve 25 lbs. of $Na_2SO_4.10H_2O$. and 5 lbs. of $Al_2(SO_4)_3.18H_2O$. in about 25 gallons of water, and then run the silicate solution slowly into the aluminium sulfate solution with constant stirring.

When all is in I allow the reaction mixture to stand for about 30 minutes and then filter off and wash the precipitate, keeping the mother liquor separate from the wash water. The mother liquor, after suitable dilution or making up, I use for dissolving aluminium sulfate for the next batch, and thereby avoid the use of new sodium sulfate. The washing is continued beyond the point where the wash water is sensibly free from sodium sulfate. This excessive washing I have found very beneficial in improving the hardness, a result which I ascribe to the phenomena of synæresis, promoted by keeping the colloid for a longer time in contact with moving water.

As a result of synæresis the colloidal product is delivered to the oven with less enmeshed water, i. e., prolonged washing results ultimately in a dryer press cake which by the process of drying (at between 60° and 100° C.) yields a harder product than would be otherwise obtained. Ordinarily where a two hours' washing is required to free the cake from sodium sulfate, a further two hours' washing will be found sufficient to promote synæresis to a satisfactory degree. The excess of water in the cake is then blown out with air, the cake spread on trays and transferred to the oven. After drying, the dry cake is thrown into water to cause it to break up into granules of a suitable size.

The product, with or without removal of the water absorbed by this process of granulating or quenching, is ready for use. Instead of washing in the press I may wash by decantation. For example, washing five times by decantation, removing 60% of the liquid at each wash, is sufficient to reduce the sodium sulfate to a negligible amount. I add four other washings to promote synæresis. I find that these extra washings add on the average about 20% to the gravimetric density and increase the hardness to a notable degree. If for any special reason I do not desire a specially hard and dense product I may omit this excessive washing.

If I wish to obtain an alumino silicic acid by stopping at point 1, I proceed exactly as described, using, however, only about 17.25 lbs. of the 40° Bé. sodium silicate.

If I wish to go to point 4, a condition of substantial saturation, I use about 100% excess of the silicate, namely 46 lbs.

In the case of the addition of the aluminium sulfate to the water glass, I dissolve 23 lbs. of sodium silicate and 25 lbs. of sodium sulfate in about 25 gallons of water and add a solution of about $3\frac{3}{4}$ lbs. of aluminium sulfate in 10 gallons of water for the product having a maximum acidity (point 1 of the corresponding curve), using about 7 lbs. of the sodium sulfate for point 3 and about 10 lbs. of the sodium sulfate for point 4. With the mixture of two or more sulfates of a heavy metal or of one or more heavy metals and aluminium (in this case including aluminium as one) I use a total of the oxides available from these sulfates approximately the amounts of heavy metal oxide or (here aluminium oxide) available from the heavy metal sulfate (here aluminium sulfate) used if but one be employed; and where a mixture of two or more silicates is used I make their combined content approximately equal to the content of the water glass.

The methyl orange test is of no real value in fixing any point on these curves with even approximate exactness. This is shown by the fact that, if a few drops of methyl orange indicator be dropped into a solution of aluminium sulfate and titrated with sodium silicate, the red color indicating acidity of the solution is displaced by the yellow, indicating neutrality long before the end of the stage wherein alkali free alumino silicic acid is the sole product obtained. This is due to the fact that a fairly strong concentration of aluminium sulfate is required to cause the acid reaction of methyl orange.

Again, the change from neutrality to alkalinity is so gradual, and the decrease of the amount of aluminium sulfate as point 2 of the curve is approached is so slow, compared with the absorption of sodium silicate by the product already formed, that it is impossible to perceive with certainty when point 2 has been reached or passed.

Similarly, when titrating sodium silicate solution with aluminium sulfate solution, no sharp color change occurs; so that neither points 3 or 4 on this curve can be definitely located with the help of methyl orange.

When operating with aluminium sulfate and sodium silicate having compositions differing from the formulæ above given for these reagents, it is therefore necessary to ascertain the location of the point of the curves at which it is desired to aim by preliminary tests which a person of average intelligence, accustomed to laboratory work will know how to make in the light of the foregoing principles. It is particularly helpful to note that point 3 corresponds to those proportions of the reagent such that mass action is required for further union; and point 4 to such proportions that any added excess is found undiminished in the mother liquor. A test of the filtered mother liquor in the first stage of the reaction to determine at which proportion of the reagents that reagent to which the other is being added ceases to attract to itself all of the added reagent, will locate point 1.

Economy of operation.

Where the sodium silicate is added to the aluminium sulfate (curves A and A'), the great advantage in adding a considerable excess of it is that the product obtained is richer in base-exchanging material (sodium oxide) than the product obtained by simply neutralizing the solution. The same is true regarding the stoppage of the working at point 1 in curves B and B', leaving the reaction mixture decidedly alkaline when the reverse process is being operated. In each case the maximum percentage of base-exchanging constituent is obtained with the use of a given quantity of aluminium sulfate, securing greater economy at the same time that a very high percentage of base-exchanging constituent is obtained.

The temperature at which the reactions take place, within considerable limits, affects the operations chiefly in the production of a poorer precipitate when the solution is heated. Hence it is not desirable ordinarily to raise the temperature.

Economical methods of combining alkali oxide with the product.

One way in which this can be done is to discontinue the addition of the alkali (here sodium) silicate as soon as an excess of alkali silicate begins to appear in the mother liquor and, before filtering the reaction mixture, add to it carbonate or bicarbonate (here sodium) in the form of a strong solution of soda ash. The amount of the sodium carbonate should then be equal to about one-tenth of a pound of dry sodium carbonate to one pound of the anticipated dry base-exchanging substance. The action of this may be explained upon the theory that the unsaturated acid group or groups of atoms to which the product owes its residuum of acid character, will absorb sodium oxide from the sodium carbonate and thereby increase the richness of the product in sodium oxide.

Another way of increasing the sodium oxide content of the final product is to dry the unsaturated product and when it comes to granulating (as by quenching) the dried product, use a five per cent. solution of soda ash and allow the product to remain in the quenching liquid for some time,—say fifteen minutes or even longer. If the amount of soda ash in this quenching liquid, be regulated according to the known capacity of the products to absorb sodium oxide from sodium carbonate, it will not be necessary to wash the product again (after quenching) in order to remove any excess of alkalinity. In this way saturation of the unsaturated product may be effected very economically. In these several methods sodium bicarbonate can also be used. Treatment with a carbonate or bicarbonate even after quenching will also add sodium oxide.

Preventing hydrolysis.

All of the above discussion is applicable to the formation of base-exchanging substances, metallo silicic acid, and cyclo silicic acid from metal salts, such as zinc, titanium, tin, lead, iron, manganese, aluminium, etc., and alkali metal silicates, but in some cases the tendency of the heavy metal salt to hydrolyze in the dilute solution in which the process is carried out, makes it necessary to prevent hydrolysis by what I herein term an anti-coagulant. This should be a dissolved "indifferent" salt, i. e., one not precipitating the heavy metal salt. In the process described using such heavy metal salts as stannic, ferric and manganic salts, for example, which would otherwise hydrolyze the hydrolysis may be prevented or may be delayed, I have discovered, until such a time as the process shall have been completed. It is not necessary that the anti-coagulant shall completely prevent hydrolysis, but merely that it shall delay or retard hydrolysis. I give three applications of this part of my invention, by way of illustration and not in limitation.

Thus when attempt is made to use a solution of ferric sulfate, technically known as "red iron", (which is now cheap enough to be seriously considered) diluted so as to contain about 1% of ferric oxide, it soon decomposes with formation of large quantities of insoluble ferric hydroxides, and therefore does not then combine with sodium silicate to form an exchange body. Except as this hydrolysis can be prevented or retarded this salt is therefore rendered unsuitable for such uses. However, various alkali salts, of which the most common are the alkali sulfates and chlorides (sodium sulfate, for example), when present in the solution, have the property of preventing or delaying this hydrolysis, keeping the ferric oxide in condition where it will readily unite with the sodium silicate. The hydrolyzable salt in concentrated form may, therefore, be diluted by a solution of sodium sulfate (in the quantity previously given for coagulant control, for example) without hydrolysis, the silicate being subsequently added.

Another way of preventing hydrolysis, is to mix the solution of the hydrolyzable salt with a normal or other salt which is not hydrolyzable. Thus a solution of basic ferric sulfate, when diluted with water, will hydrolyze, but if first mixed with 20% to 60% of its equivalent of aluminium sulfate (itself precipitable by the silicate solution), the mixed solution may then be diluted with water without hydrolysis or, at least, the hydrolysis may be delayed until ample time has elapsed in which to precipitate with sodium silicate. In this case the precipitate will consist of a mixture of aluminic and ferric products. In its result as a fluid treating substance, it will resemble a mixture of the substances separately prepared and then mixed for use, but each grain will contain both.

Ferric chloride will also make ferric sulfate nonhydrolyzable in this sense of delaying hydrolysis.

Another method of preventing hydrolysis, coming within my invention, is by the addition of sufficient acid to the hydrolyzable heavy metal salt to keep the hydroxide in solution. A low percentage, as little as two or three per cent (of the weight of the heavy metal salt) of such an acid as sulphuric or hydrochloric acid, for example, would ordinarily be sufficient to accomplish this. It offers both objections and advantages. The chief objection is that the acid would require neutralization by a proportionate quantity of the silicate before the reaction could begin. This would result in an equivalent amount of silica being set free and appearing in the product. This will contribute to the hardening of the product, though at the expense of the additional silicate required. The acid anti-coagulant thus performs the double function of preventing hydrolysis and hardening the product.

The preferred anti-coagulants and also the coagulants are neutral salts of alkali metals.

Some colored solutions (e. g., ferric sulfate) mask the indicator and make it necessary to use a cut-and-try method of determining the proportions.

*Hardening the grains and increasing the gravimetric density.*

Thus far my process has been described with reference to the mixing of the solutions without any special provision for hardening of the grains or increasing their density; and this previous discussion holds true whether special hardening or densifying be applied or not. However, in order to protect in shipping; to prevent stratification in use and undue wastage during the operation of the filter itself; to reduce volume required, and, consequently, the size of the container; to maintain spacing between the grains which space would be clogged by the dust or small particles with much breakage of the individual grains; and to maintain the bed but little disturbed by fluid flow through it in either direction, to reduce the loss of material by back-washing; increase of the hardness and gravimetric density are very desirable.

By way of illustration of my invention I disclose herein several practical methods of increasing this density and hardness. One method of doing this is by what I have preferred to term a coagulant; which as it happens in the individual case, may be the same substance, sodium sulfate, which was pointed out by me as capable of use as an anti-coagulant in the prevention or delay of hydrolysis of heavy metal salts.

The presence of this substance, sodium sulfate, or of any other salt which is "indifferent" to both the reagents used in the main operation, produces a very marked difference in the character of the grains.

The precipitate formed is still colloidal and is treated in the same manner as if the sodium sulfate or other indifferent salt were not used, except that the reaction shall take place in the presence of the indifferent salt. To secure this the indifferent salt may be added to both reagents or, preferably, it may be added to the reagent into which the other reagent is poured. It takes no part in the process other than to control the character of the precipitate, making it harder and much more dense.

At the start I provide a considerable quantity of the neutral salt as compared with the reagent to which the other is added, obtaining excellent results with five times as much $Na_2SO_4.10H_2O$. as $Al_2(SO_4)_3.18H_2O$, and dissolving 25 pounds of the former and 5 pounds of the latter in 25 gallons of water. As a result of the reactions sodium sulfate is added to the solution, with the result that the mother liquor may be used to make new solution with dilution, or addition of sodium sulfate as may be required.

As compared with a gravimetric density of approximately .35 obtained by the process described by Rudorf, I have obtained a gravimetric density as high as .70 and have uniformly obtained results between .45 and .70 along with the high exchange value which I have obtained, whether in the product loaded with sodium oxide or in the metallo silicic acid form, or in the cyclo silicic acid form.

I obtain great hardness, high resistivity in mechanical abrasion, high porosity and very strong cohesion. The differences in gravimetric density are very slight between the metallo silicic acid form and the sodium metallo silicate form (that which has been loaded with sodium oxide) but somewhat greater between either of these and the cyclo silicic acid form or cyclo silicate derived therefrom, which is perhaps as much as 20% lighter in weight than either of the others above. All four forms are noticeably harder and of greater gravimetric density than the several products made without the use of a coagulant or by the promotion of synæresis. All have the same general form of grain and the form of grain remains substantially unchanged when the sodium metallo silicic acid is changed to metallo silicic acid by treatment, in the bed or out of it, with acid (I prefer a five or ten per cent solution of a mineral acid such as sulphuric or hydrochloric) or when the latter is changed to cyclo silicic acid by excessive treatment with such an acid.

I obtain a hard, frangible, glassy grain, as it comes out of the oven, and that has a sharply defined resistive surface and is translucent.

*The coagulant.*

Different neutral salts of alkali metals may be used for the coagulant. Of the many examples of this I might suggest as the most common ones, the alkali sulfates and chlorides.

With the use of the coagulant a greater weight of product is secured.

The second form of hardening is by the use of two salts of a heavy metal together, obtaining, for example, quite noticeably harder product where $Fe_2(SO_4)_3$. is used also, even if only a trace, as compared with $Al_2(SO_4)_3$. alone.

It may be noted also that washing before drying also affects the hardness whether the coagulant be used or not. The washing takes out $Na_2SO_4$. for example, and gives greater hardness and density for this reason, but is not essential to the production of the product. Further washing or ageing (allowing it to stand after precipitation whether under water or not) causes hardening by synæresis.

Where washing is omitted before the drying operation it does not follow that there is no washing to remove $Na_2SO_4$. It may be removed at any time after drying by intentional washing or normal use, though this will not increase the gravimetric density or hardness.

*Cyclo silicic acid.*

The product above may be or may not be combined with an alkali metal oxide, such as sodium oxide. If so it has the general formula of an alkali silicate. If not it has no metal and acts much as does a silicic acid. Starting with the form having a large alkali metal oxide content such as sodium alumino silicate or a metallo silicic acid, treatment by a strong acid, ordinarily a mineral acid, as indicated will remove the alkali and—or— metal and will change the material, in the bed or in manufacture, to what I believe to be a new form of hydrated silica which I have preferred to call cyclo silicic acid. It will be in the same form of granules, hard if the metallo silicic acid had been hard (otherwise chalky as the other had been) and in other ways of like appearance to the previous product; but will be somewhat lighter in weight (in some cases as much as 20%) due to the removal of the metal. It is not quite so heavy as the acid. The extent of the reduction in weight depends upon the character of the metal of the metallo silicic acid, and the intensity of the action of the acid used.

The hydrated silica (cyclo silicic acid) which has taken up calcium, say, may be treated either in the bed or separately, as with common salt by mass action, to displace the calcium by sodium, making a base exchanging substance which is an alkali-metal cyclo silicate and can be used much as the alkali metallo silicate is used, or may be changed to the cyclo form by acid if desired.

The sodium (for instance) metallo silicate may be used as a base-exchanging substance, or as a source of metallo silicic acid (by treatment with acid). Also the metallo silicic acid may be used as a source of metallo silicates or cyclo silicic acid may be made.

These acids and their salts are practically insoluble in water and may therefore be brought into contact freely with aqueous solutions, without entering into solution with them. Though insoluble, the acids have the power of entering into chemical reaction with dissolved alkaline substances and salts of acids weaker than themselves which may be in the solutions passed through them. They can neutralize any free bases present and decompose the salts of the weaker acids. The bases of the salts of metallo silicic acid exchange with the bases of other compounds.

*Contrasted uses.*

All four types of these materials are useful for treating liquids. For certain purposes they have almost equal value. However, for the removal of sodium and sodium compounds from water, it would be impracticable to use the sodium metallo silicate form because the sodium itself would not replace the sodium and there would not be an exchange of base. If the material is to be used after a lime-soda softener, for example, it may therefore be quite desirable to use either the metallo or cyclo silicic acid form and regenerate with strong acid.

Metallo silicic acid and cyclo silicic acid will remove free bases and will decompose the salts of weaker acids, the bases of the salts being fixed in the form of insoluble salts of metallo silicic acid, the weaker acid radical previously in combination with the absorbed bases being set free. This may be removed by other means or ignored. Either acid will neutralize and fix the metallo constituents of alkaline hydroxides, carbonates, bicarbonates, and other weak acid salts and can be regenerated with strong mineral acid to produce a salt soluble in water.

The alkali (here sodium) metallo silicates will do much that the cyclo silicic acid will not do. They will remove the alkaline earth bases from chlorides, sulfates and nitrates.

Among the basic hydroxides whose metal content will be removed by the metallo or cyclo silicic acid are those of sodium, potassium, ammonium, lithium, calcium, magnesium, barium and strontium. All of these except sodium will be replaced by the sodium of sodium metallo silicate by mass action.

The metallo and cyclo silicic acids find one use among others in removing the alkalinity from water met with in arid lands, with regeneration to chlorides by HCl or to sulfates by $H_2SO_4$.

*Regeneration.*

In the first and second forms, that is in the alkali metallo silicates and in the metallo silicic acid forms, regeneration can take place by any of three means. The first of these is by the use of a salt. Any neutral alkali metal salt can be used to regenerate. Common salt, NaCl is the cheapest and among the best. A five or ten per cent solution suffices. Alkaline earth salts could be used here, except that they are or may be the very things we are trying to get rid of, as in softening water.

Let us suppose that calcium has been removed from the water treated, then the calcium has taken the place of the sodium in the alkali metallo silicate, or cyclo silicate, and the regeneration by mass action by salt solution will resubstitute the sodium for the calcium. In the case of the metallo silicic acid, or cyclo silicic acid, the calcium will have been added to make a calcium metallo silicate or a calcium cyclo silicate, and the treatment (not strictly regeneration) by mass action with salt solution will result in the substitution of the sodium and the formation of sodium metallo silicate or sodium cyclo silicate, the former of which is the first form and the best form for removal of hardness constituent.

The second form of regeneration, strong acid, is applicable to the alkali metallo silicate, and to the metallo and cyclo silicic acids and is capable of changing an alkali cyclo silicate to cyclo silicic acid. On account of its cheapness, as well as the strength, an appropriate mineral acid such as sulphuric or hydrochloric acid is best. Metallo silicic acid which has taken up calcium, we will say, to make a calcium metallo silicate, is best regenerated by just sufficient five or ten per cent acid solution to remove the calcium and avoid action by the acid upon the metal of the metallo silicic acid to leave cyclo silicic acid or a mixture of the two.

The third form of regeneration is by the use of a weaker acid in mass action. Even carbonic acid will do, applied in great excess and high concentration. I have used 90% concentration. The rapidity of action will depend upon both the quantity and the concentration which can be tried out readily for any given acid and bed.

The cyclo silicate formed when cyclo silicic acid takes up any of the alkali metals or alkaline earths can be regenerated by acid to form cyclo silicic acid or by mass action by salt to make a base-exchanging (say sodium) cyclo silicate which will serve just as would the corresponding metallo silicate.

So far as I have been able to determine, my new form of cyclo silicic acid has substantially the same formula ($4SiO_2.H_2O$) whatever the formula of the metallo silicic acid from which it is formed. This would seem to indicate that only one cyclo silicic acid can be formed from the large variety of metallo silicic acids obtainable by my processes.

That variations in my metallo silicic acids occur will be evident from contemplation of the different formulæ for the products at different points on the curves as well as from the different metals entering into them.

The operation is similar to that of other base-exchanging substances. The liquid treated is filtered through a bed of the material until the latter is substantially saturated, after which the regenerating liquid is passed through the bed, usually in a reverse direction.

I have not attempted to give a complete list of the materials capable of use to obtain the benefits of my invention for the very obvious reason that though the line of development in view of my disclosure is simple and easy, the field is large, and an undue length of time would be required to cover it fully, and my specification would be unduly prolonged. With the principles, data and examples given, further developments, refinements and changes in the several processes and the production of different specific forms of my product will fall reasonably and properly within the spirit and scope of my invention and must be interpreted accordingly.

Having thus described my invention, what I claim as new and desire to secure by Letters Patent is:

1. The process of making base-exchanging substances of maximum content of exchangeable base which consists in mixing dilute aqueous solutions of a salt of an amphoteric metal in which the metal acts as a base and an excess, beyond that required for neutrality, of an alkali silicate to produce a precipitate, drying the precipitate and quenching the dried precipitate in a solution capable of yielding an alkali metal oxide to the product.

2. The process of making base-exchanging substances having a maximum content of exchangeable base which consists in mixing dilute aqueous solutions of a plurality of salts of amphoteric metals in which the metals act as bases and of one or more alkali metal silicates to form a precipitate, drying the precipitate and treating the precipitate with a solution capable of yielding an alkali metal oxide thereto.

3. The process of making base-exchanging substances having a maximum content of exchangeable base which consists in mixing a dilute aqueous solution of a plurality of salts of amphoteric metals in which the metals act as bases and a dilute aqueous solution of alkali metal silicate to form a precipitate, drying the precipitate and quenching the dried precipitate in a solution yielding an alkali metal oxide thereto.

4. The process of making liquid treating substances having a capacity for taking up bases from water which consists in mixing dilute aqueous solutions of aluminium sulphate and ferric sulfate on the one hand and sodium silicate on the other.

5. The process of making liquid treating substances having a high content of exchangeable base which consists in mixing dilute aqueous solutions of aluminium sulphate and ferric sulfate on the one hand and sodium silicate on the other in such proportions that the reaction mixture shall be distinctly alkaline to phenolphthalein.

6. The process of making substances having a high capacity for taking up bases from water which consists in mixing dilute aqueous solutions of aluminium sulfate and ferric sulfate on the one hand and sodium silicate on the other in the presence of sodium sulfate.

7. The process of making base-exchanging substances which consists in mixing dilute aqueous solutions of aluminium sulfate and ferric sulfate on the one hand and sodium silicate on the other in the presence of sodium sulfate and in such proportions that the reaction mixture shall be distinctly alkaline to phenolphthalein.

8. A water-softening material comprising an alkali metallo silicate in the form of hard, glassy grains having a gravimetric density in excess of .40.

9. A base exchanging substance comprising an alkali metallo silicate having hard glassy grains having a blue-gray color and a gravimetric density in excess of .40 and a high metallic oxide content.

10. A base-exchanging substance substantially saturated with an alkali metal oxide and having a gravimetric density in excess of .40.

11. A liquid-treating substance comprising a metallo silicate of aluminium having a gravimetric density in excess of .40.

12. An alkali metallo silicate, frangible, hard and glassy and having a high resistive surface as distinguished from pulverulent, chalklike, smudgy and dull.

13. A liquid-treating substance comprising silicates of aluminium and iron.

14. A metallo silicic acid for water treating purposes of granular form and substantially saturated with sodium oxide.

OSWIN W. WILLCOX.